United States Patent
Xia et al.

(10) Patent No.: US 9,736,789 B2
(45) Date of Patent: Aug. 15, 2017

(54) POWER LINE COMMUNICATION-BASED LOCAL HOTSPOT WITH WIRELESS POWER CONTROL CAPABILITY

(71) Applicant: ASOKA USA CORPORATION, Santa Clara, CA (US)

(72) Inventors: Mingyao Xia, Shenzhen (CN); Eric Grubel, Thousand Oaks, CA (US); Dan Castellano, Cupertino, CA (US)

(73) Assignee: Asoka USA Corporation, Santa Clara, CA (US)

( * ) Notice: Subject to any disclaimer, the term of this patent is extended or adjusted under 35 U.S.C. 154(b) by 0 days.

(21) Appl. No.: 13/725,144

(22) Filed: Dec. 21, 2012

(65) Prior Publication Data

US 2013/0182588 A1     Jul. 18, 2013

Related U.S. Application Data

(63) Continuation-in-part of application No. 13/153,194, filed on Jun. 3, 2011, now Pat. No. 8,364,326, which
(Continued)

(51) Int. Cl.
*G08B 5/22*     (2006.01)
*H04W 52/24*     (2009.01)
*H02J 13/00*     (2006.01)

(52) U.S. Cl.
CPC ....... *H04W 52/245* (2013.01); *H02J 13/0024* (2013.01); *H02J 13/0055* (2013.01);
(Continued)

(58) Field of Classification Search
CPC ............... H04W 52/245; H02J 13/0024; H02J 13/0055; H02J 13/0082
(Continued)

(56) References Cited

U.S. PATENT DOCUMENTS 5,090,024 A *   2/1992   Vander Mey et al.
5,553,072 A *   9/1996   Daggett et al.
(Continued)

OTHER PUBLICATIONS

Heile, , "Smart Grids for Green Communcations", IEEE Wireless Communications, Jun. 2010, pp. 4-6 (online). Retrieved on Jul. 4, 2012, internet URL:,http://dl.comsoc.org/livepubs/pci/public/2010/jun/pdf/wciindpersp.pdf>, entire document, 4-6.

*Primary Examiner* — Hai Phan
*Assistant Examiner* — Royit Yu
(74) *Attorney, Agent, or Firm* — Michael A. Glenn; Perkins Coie LLP

(57) ABSTRACT

A method and a system for providing wireless communication facility with low interference between multiple wireless devices providing hotspot wireless coverage within a local area of an integrated enterprise or integrated home environment is disclosed. The sensor devices implementing hotspots are connected to a local area network (LAN) based on power line communication (PLC) and enabled with wireless power output control capability, allowing the coverage of area of each sensor device to be adjusted. The power output control is by a switch which allows the power output to be increased and decreased depending on coverage required and the output of the nearest hotspot. The power output level is indicated on the sensor by LEDs to enable resetting and adjustment. The use of power control and elimination of coverage overlap allow multiple hotspots to be used for achieving good connectivity while reducing interferences and noise within hotspots during connection and use.

18 Claims, 5 Drawing Sheets

Related U.S. Application Data is a continuation of application No. 13/032,454, filed on Feb. 22, 2011.

(52) U.S. Cl.
CPC ......... *H02J 13/0082* (2013.01); *Y02B 90/244* (2013.01); *Y02E 60/74* (2013.01); *Y02E 60/7815* (2013.01); *Y02E 60/7823* (2013.01); *Y04S 10/30* (2013.01); *Y04S 20/327* (2013.01); *Y04S 40/121* (2013.01); *Y04S 40/122* (2013.01)

(58) Field of Classification Search
USPC ............... 340/7.37; 455/63.4, 101, 423–424, 455/446–448, 456; 370/254, 338, 464
See application file for complete search history.

(56) References Cited

U.S. PATENT DOCUMENTS

| | | | |
|---|---|---|---|
| 5,572,438 A * | 11/1996 | Ehlers et al. | |
| 5,630,204 A | 5/1997 | Hylton et al. | |
| 5,999,612 A * | 12/1999 | Dunn et al. | |
| 6,252,883 B1 * | 6/2001 | Schweickart et al. | |
| 6,378,131 B2 * | 4/2002 | Cunningham et al. | |
| 6,453,687 B2 | 9/2002 | Sharood et al. | |
| 6,553,418 B1 * | 4/2003 | Collins et al. | |
| 6,633,823 B2 * | 10/2003 | Bartone et al. | |
| 6,826,607 B1 | 11/2004 | Gelvin et al. | |
| 6,834,045 B1 * | 12/2004 | Lappetelainen ...... H04W 40/00 370/329 |
| 6,854,059 B2 | 2/2005 | Gardner | |
| 6,882,709 B1 | 4/2005 | Sherlock et al. | |
| 6,934,862 B2 | 8/2005 | Sharood et al. | |
| 6,956,464 B2 | 10/2005 | Wang et al. | |
| 6,961,641 B1 | 11/2005 | Forth et al. | |
| 6,988,025 B2 * | 1/2006 | Ransom et al. | |
| 6,990,395 B2 * | 1/2006 | Ransom et al. | |
| 6,993,417 B2 | 1/2006 | Osann, Jr. | |
| 7,020,701 B1 | 3/2006 | Gelvin et al. | |
| 7,113,763 B2 | 9/2006 | Heinonen et al. | |
| 7,136,936 B2 | 11/2006 | Chan et al. | |
| 7,142,094 B1 | 11/2006 | Davidow et al. | |
| 7,173,938 B1 | 2/2007 | Davidow | |
| 7,194,528 B1 | 3/2007 | Davidow | |
| 7,231,280 B2 | 6/2007 | Costa | |
| 7,231,281 B2 | 6/2007 | Costa | |
| 7,245,472 B2 | 7/2007 | Davidow | |
| 7,319,717 B2 | 1/2008 | Zitting | |
| 7,345,998 B2 | 3/2008 | Cregg et al. | |
| 7,363,398 B2 | 4/2008 | Scott | |
| 7,415,541 B2 | 8/2008 | Chan et al. | |
| 7,423,546 B1 | 9/2008 | Aisa | |
| 7,444,401 B1 | 10/2008 | Keyghobad | |
| 7,461,174 B2 | 12/2008 | Chan et al. | |
| 7,463,986 B2 | 12/2008 | Hayes | |
| 7,688,841 B2 | 3/2010 | Binder | |
| 7,690,949 B2 | 4/2010 | Binder | |
| 7,701,331 B2 | 4/2010 | Tran | |
| 7,734,380 B2 * | 6/2010 | Ransom et al. | |
| 7,734,572 B2 | 6/2010 | Wiemeyer et al. | |
| 7,738,999 B2 | 6/2010 | Petite | |
| 7,751,795 B2 | 7/2010 | Mccarty et al. | |
| 7,752,309 B2 | 7/2010 | Keyghobad et al. | |
| 7,769,907 B2 | 8/2010 | Chan | |
| 7,769,908 B2 | 8/2010 | Chan et al. | |
| 7,773,361 B2 | 8/2010 | Davidow | |
| 7,778,152 B2 | 8/2010 | Chan | |
| 7,825,793 B1 | 11/2010 | Spillman et al. | |
| 7,826,395 B2 | 11/2010 | Kim | |
| 7,848,759 B2 * | 12/2010 | Kim et al. ................. 455/453 |
| 7,961,111 B2 | 6/2011 | Tinaphong et al. | |
| 8,213,895 B2 | 7/2012 | Hurwitz et al. | |
| 8,290,628 B2 | 10/2012 | Yeo | |
| 8,295,990 B2 | 10/2012 | Venkatakrishnan et al. | |
| 8,306,634 B2 | 11/2012 | Nguyen et al. | |
| 8,364,326 B2 | 1/2013 | Xia et al. | |
| 8,374,729 B2 | 2/2013 | Chapel et al. | |
| 8,412,387 B2 | 4/2013 | Park et al. | |
| 8,503,150 B2 | 8/2013 | Chang | |
| 8,644,166 B2 | 2/2014 | Xia et al. | |
| 8,868,248 B2 | 10/2014 | Park | |
| 9,063,528 B2 | 6/2015 | Xia et al. | |
| 2002/0023267 A1 | 2/2002 | Hoang | |
| 2002/0026532 A1 | 2/2002 | Maeda et al. | |
| 2002/0026646 A1 | 2/2002 | Hoang | |
| 2002/0114336 A1 | 8/2002 | Chow | |
| 2002/0165943 A1 | 11/2002 | Hoang | |
| 2002/0170059 A1 | 11/2002 | Hoang | |
| 2003/0050737 A1 | 3/2003 | Osann, Jr. | |
| 2004/0022304 A1 | 2/2004 | Santhoff et al. | |
| 2004/0070912 A1 | 4/2004 | Kopp | |
| 2004/0106412 A1 | 6/2004 | Laroia et al. | |
| 2004/0138786 A1 | 7/2004 | Blacket et al. | |
| 2004/0139472 A1 | 7/2004 | Furet et al. | |
| 2004/0148632 A1 | 7/2004 | Park et al. | |
| 2004/0155985 A1 | 8/2004 | Dethier et al. | |
| 2004/0193329 A1 | 9/2004 | Ransom et al. | |
| 2004/0203989 A1 * | 10/2004 | Karaoguz ....................... 455/522 |
| 2004/0212481 A1 | 10/2004 | Abraham | |
| 2005/0008345 A1 | 1/2005 | Choi et al. | |
| 2005/0018766 A1 | 1/2005 | Iwamura | |
| 2005/0030968 A1 * | 2/2005 | Rich et al. ..................... 370/449 |
| 2005/0157215 A1 | 7/2005 | Minnick et al. | |
| 2005/0160467 A1 | 7/2005 | Moons et al. | |
| 2005/0184867 A1 | 8/2005 | Osann, Jr. | |
| 2005/0207079 A1 | 9/2005 | Tiller et al. | |
| 2005/0272402 A1 | 12/2005 | Ferentz et al. | |
| 2006/0049694 A1 | 3/2006 | Kates | |
| 2006/0083206 A1 * | 4/2006 | Min ................................ 370/338 |
| 2006/0088149 A1 | 4/2006 | Sung | |
| 2006/0099954 A1 * | 5/2006 | Henderson et al. .......... 455/447 |
| 2006/0168624 A1 | 7/2006 | Carney et al. | |
| 2006/0222086 A1 | 10/2006 | Frye, Jr. | |
| 2006/0227884 A1 | 10/2006 | Koga et al. | |
| 2007/0043477 A1 | 2/2007 | Ehlers | |
| 2007/0061487 A1 | 3/2007 | Moore et al. | |
| 2007/0130598 A1 | 6/2007 | Choi et al. | |
| 2007/0132579 A1 | 6/2007 | Kim | |
| 2007/0183543 A1 | 8/2007 | Lu | |
| 2007/0204286 A1 | 8/2007 | Candelore | |
| 2007/0213879 A1 | 9/2007 | Iwamura | |
| 2007/0229231 A1 | 10/2007 | Hurwitz et al. | |
| 2007/0233323 A1 | 10/2007 | Wiemeyer et al. | |
| 2007/0250900 A1 | 10/2007 | Marcuvitz | |
| 2008/0015740 A1 | 1/2008 | Osann, Jr. | |
| 2008/0024605 A1 | 1/2008 | Osann, Jr. | |
| 2008/0106146 A1 | 5/2008 | Baek et al. | |
| 2008/0130640 A1 | 6/2008 | Hurwitz | |
| 2008/0137572 A1 | 6/2008 | Park et al. | |
| 2008/0195562 A1 | 8/2008 | Worth et al. | |
| 2008/0221737 A1 | 9/2008 | Josephson et al. | |
| 2008/0259888 A1 * | 10/2008 | Terashima ..................... 370/338 |
| 2008/0317070 A1 | 12/2008 | Propp et al. | |
| 2009/0040057 A1 | 2/2009 | Keyghobad et al. | |
| 2009/0093916 A1 | 4/2009 | Parsonnet et al. | |
| 2009/0099629 A1 | 4/2009 | Carson et al. | |
| 2009/0117915 A1 | 5/2009 | Lee et al. | |
| 2009/0135848 A1 * | 5/2009 | Chan et al. .................... 370/464 |
| 2009/0175321 A1 * | 7/2009 | Sasaki et al. .................. 375/219 |
| 2009/0182862 A1 * | 7/2009 | Thomson et al. ............. 709/224 |
| 2009/0187499 A1 | 7/2009 | Mulder et al. | |
| 2009/0190553 A1 * | 7/2009 | Masuda et al. ................ 370/331 |
| 2009/0195349 A1 | 8/2009 | Frader-Thompson et al. | |
| 2009/0225679 A1 * | 9/2009 | Bims .............................. 370/254 |
| 2009/0262665 A1 | 10/2009 | Kim et al. | |
| 2009/0287838 A1 | 11/2009 | Keyghobad et al. | |
| 2009/0287966 A1 | 11/2009 | Keyghobad et al. | |
| 2009/0319853 A1 | 12/2009 | Keyghobad et al. | |
| 2010/0027599 A1 | 2/2010 | Di Chiro et al. | |
| 2010/0070217 A1 | 3/2010 | Shimada et al. | |
| 2010/0075661 A1 * | 3/2010 | Li ................................. 455/423 |
| 2010/0076701 A1 | 3/2010 | Harish | |
| 2010/0082499 A1 | 4/2010 | Luff | |

(56) References Cited

U.S. PATENT DOCUMENTS

| | | |
|---|---|---|
| 2010/0091745 A1* | 4/2010 | Bevan et al. .................. 370/338 |
| 2010/0094475 A1 | 4/2010 | Masters et al. |
| 2010/0095335 A1 | 4/2010 | Wilson et al. |
| 2010/0097528 A1 | 4/2010 | Seo |
| 2010/0102987 A1 | 4/2010 | Lou et al. |
| 2010/0105336 A1* | 4/2010 | Attar et al. .................. 455/67.11 |
| 2010/0106342 A1 | 4/2010 | Ko et al. |
| 2010/0121968 A1 | 5/2010 | Clark et al. |
| 2010/0128711 A1* | 5/2010 | Klein et al. .................. 370/338 |
| 2010/0138066 A1 | 6/2010 | Kong |
| 2010/0156666 A1 | 6/2010 | Choi et al. |
| 2010/0169940 A1 | 7/2010 | Howarter et al. |
| 2010/0182160 A1 | 7/2010 | Lu |
| 2010/0204850 A1 | 8/2010 | Henderieckx |
| 2010/0207728 A1 | 8/2010 | Roscoe et al. |
| 2010/0217449 A1 | 8/2010 | Musti et al. |
| 2010/0228601 A1 | 9/2010 | Vaswani et al. |
| 2010/0233975 A1 | 9/2010 | Wu et al. |
| 2010/0241245 A1 | 9/2010 | Wiemeyer et al. |
| 2010/0250497 A1 | 9/2010 | Redlich et al. |
| 2010/0292858 A1 | 11/2010 | Iwamura et al. |
| 2010/0327766 A1 | 12/2010 | Recker et al. |
| 2010/0332164 A1 | 12/2010 | Aisa et al. |
| 2011/0035491 A1 | 2/2011 | Gelvin et al. |
| 2011/0037589 A1 | 2/2011 | Liu et al. |
| 2011/0040785 A1 | 2/2011 | Steenberg et al. |
| 2011/0054700 A1 | 3/2011 | Chan et al. |
| 2011/0054710 A1 | 3/2011 | Imes et al. |
| 2011/0066300 A1 | 3/2011 | Tyagi et al. |
| 2011/0077758 A1 | 3/2011 | Tran et al. |
| 2011/0082599 A1 | 4/2011 | Shinde et al. |
| 2011/0087522 A1 | 4/2011 | Beaty et al. |
| 2011/0089752 A1 | 4/2011 | Beaty et al. |
| 2011/0093221 A1 | 4/2011 | Dhanjal |
| 2011/0121654 A1 | 5/2011 | Recker et al. |
| 2011/0147190 A1* | 6/2011 | GaleWyrick et al. ........ 200/5 B |
| 2011/0161251 A1 | 6/2011 | Carey et al. |
| 2011/0184581 A1 | 7/2011 | Storch et al. |
| 2011/0196547 A1 | 8/2011 | Park et al. |
| 2011/0202190 A1 | 8/2011 | Venkatakrishnan et al. |
| 2011/0202198 A1 | 8/2011 | Venkatakrishnan et al. |
| 2011/0202910 A1 | 8/2011 | Venkatakrishnan et al. |
| 2011/0215736 A1 | 9/2011 | Horbst et al. |
| 2011/0231320 A1 | 9/2011 | Irving |
| 2011/0238235 A1 | 9/2011 | Xia |
| 2011/0263277 A1* | 10/2011 | Zuniga Gallegos .. H04W 16/20 455/466 |
| 2011/0264286 A1 | 10/2011 | Park |
| 2011/0264291 A1 | 10/2011 | Le Roux et al. |
| 2011/0271317 A1 | 11/2011 | Xia et al. |
| 2011/0307109 A1 | 12/2011 | Sri-Jayantha |
| 2012/0001548 A1 | 1/2012 | Recker et al. |
| 2012/0053737 A1 | 3/2012 | Valluri et al. |
| 2012/0066023 A1 | 3/2012 | Xia |
| 2012/0095610 A1 | 4/2012 | Chapel et al. |
| 2012/0109395 A1 | 5/2012 | Finch et al. |
| 2012/0265357 A1 | 10/2012 | Song et al. |
| 2012/0271472 A1 | 10/2012 | Brunner et al. |
| 2013/0013234 A1 | 1/2013 | Ahmed et al. |
| 2013/0054044 A1 | 2/2013 | Shaffer et al. |
| 2013/0116846 A1 | 5/2013 | Galsim et al. |
| 2013/0158911 A1 | 6/2013 | Young et al. |

\* cited by examiner

Description

| Transmission Power setting | LED 1 | LED 2 | LED 3 |
|---|---|---|---|
| RF power off | OFF | OFF | OFF |
| RF power Low | ON | OFF | OFF |
| RF power medium | ON | ON | OFF |
| RF power high | ON | ON | ON |

1. Three LEDs to indicate wireless power level.
2. Push button switch to turn on wireless powwer.
3. Push or (push and hold for 3 sec.) the push button switch to move from one level to another.

POWER LINE COMMUNICATION-BASED LOCAL HOTSPOT WITH WIRELESS POWER CONTROL CAPABILITY

CROSS REFERENCE TO RELATED APPLICATIONS

This application is a continuation-in-part of U.S. patent application Ser. No. 13/153,194 entitled, "A SET OF SENSOR UNITS FOR COMMUNICATION ENABLED FOR STREAMING MEDIA DELIVERY WITH MONITORING AND CONTROL OF POWER USAGE OF CONNECTED APPLIANCES" filed on Jun. 3, 2011; which in turn is a continuation-in-part of U.S. patent application Ser. No. 13/032,454 entitled, "METHOD AND APPARATUS FOR USING PLC-BASED SENSOR UNITS FOR COMMUNICATION AND STREAMING MEDIA DELIVERY, AND FOR MONITORING AND CONTROL OF POWER USAGE OF CONNECTED APPLIANCES, filed Feb. 22, 2011, both of which applications are incorporated herein in their entirety by this reference thereto.

BACKGROUND OF THE INVENTION

Technical Field

The invention relates to providing wireless coverage within a local area network. More specifically the invention is directed to providing multiple hotspots providing effective area coverage within a wireless local area network with the hotspots spatially separated, but operating simultaneously.

Description of the Background Art

Communications via power lines has been known from early in the 20$^{th}$ century. Due to its higher costs and other limitations for extending connectivity, the use of power line communication (PLC) systems has been limited to local area networks (LANs) within homes or offices or, at best, within apartment complexes. PLC has also found a limited number of applications where other types of communication methods do not provide the security and remote connectivity, such as for power line control applications. Basic devices for connecting to the power line for communication and power supply have been designed and used to provide service within LANs. Due to more efficient competing technologies, the infrastructure for PLC never developed to make it a mainstream technology. As a result, more advanced devices for communication using the PLC technology also were never developed.

It is advantageous to identify applications where PLC technology can be optimally used and to develop devices and systems to cater to such applications. One such application that is emerging is providing effective wireless coverage within a local area (wireless LAN area) such as an office, home, small business location, etc. using multiple wireless hotspot sensor (WHS) devices simultaneously.

One problem of having multiple WHS devices or units operating using the same frequency in proximity to each other is interference and fading within the coverage area due to signal overlap from the transmitted signals from multiple WHS devices. Multiple WHS devices become necessary when the wireless LAN area that needs to be covered by wireless connectivity exceeds the capability of a single WHS device.

Prior art technology uses transmitters with different frequencies to eliminate interference when multiple WHS devices have to be provided adjacent to each other within a wireless LAN to have wireless coverage of the wireless LAN area. FIG. 1 is a pictorial depiction 100 of prior art. The data from a data store 101 is modulated in the modulators 102, 103, and 104, each using a different frequency. The modulated frequency is impressed over the same transmission medium and sent through the cloud 105. The transmitted modulated data is received and separated into the three frequencies using the filters 120, 121, and 122. The data is transmitted by the adjacent WHS devices 123, 124, and 125, each using a different frequency. In this case adjacent WHS devices operate at different frequencies covering the three adjacent rooms 110, 111, and 112. The adjacent sensor devices 123, 124, and 125 are designed to have differing frequencies that do not interfere with each other even though the sensors are close to each other. With the transmitted power lobes 126, 127, and 128 overlapping at regions 130 and 131, if a single frequency spectrum is used for transmission of data by the sensors, then fading and interference in will occur in the regions of overlap 130 and 131, limiting the coverage provided. Though sensors with multiple frequencies is an elegant solution to the interference and fading problem when covering a LAN covering a large area, the use of multiple frequencies requires transmitters, filters, and sensors for each distinct frequency used by sensors that are adjacent to each other. This is an expensive solution. However, this is the only solution available today where multiple hotspots are needed to cover large areas within a wireless LAN because it is not feasible to cover the area with a single WHS unit.

SUMMARY OF THE INVENTION

A WHS system is provided that comprises multiple WHSs in a local area network (LAN) in which each of the multiple sensors transmits using the same frequency spectrum. Each of the WHSs comprises a switch and a power level indicator. The switch on each sensor may be used to adjust the radio frequency (RF) power levels transmitted by the sensor. The power level indicator on each sensor provides an indication of how much power is being used to transmit the wireless signal.

When sensors in close proximity transmit on a common frequency spectrum, the power lobe for one sensor may interfere with the power lobe of another adjacent sensor, causing interference and fading. A method is provided for adjusting the power of each sensor independently so as to optimize coverage of the local area and to minimize interference and fading.

Coverage provided by the power lobe generated by each sensor is measured or checked at usable locations within the expected coverage area using a standard wireless transmitter-receiver unit, and the power is increased to maximize coverage. However, if the power level setting that provides coverage causes interference or fading at the receiver at usable locations, then the power is decreased to minimize the interference or fading. Determining coverage, interference, and fading determines whether to increase, decrease, or maintain the power level for each sensor, thereby providing the best usable wireless coverage within the LAN. (Usable locations are locations within the coverage area where systems and communication devices that connect to the internet typically would be placed.)

In addition, a PLC network may be used to provide a wired connection within a PLC LAN to the WHS devices. The PLC LAN may provide connectivity to appliances connected by wire to it. The use of existing power lines as the source of power and data to the WHS devices eliminates the need and cost of data capable high frequency wiring within the PLC LAN to transport the data to the wireless sensor devices. PLC-connected WHSs providing wireless capability that caters to the needs of communication and streaming media delivery within a home or office may be a beneficial application of PLC technology.

DETAILED DESCRIPTION OF THE INVENTION

A method and a system for providing wireless communication facility with low interference between multiple wireless devices providing hotspot wireless coverage within a local area of an integrated enterprise or integrated home environment is disclosed. The sensor devices implementing hotspots may be connected to a PLC LAN and enabled with wireless power output control capability, allowing the coverage of area of each sensor device to be adjusted. The power output control is by a switch which allows the power output to be increased and decreased depending on coverage required and the output of the nearest hotspot. The power output level is indicated on the sensor by LEDs to enable resetting and adjustment. The use of power control and elimination of coverage overlap allow multiple hotspots to be used for achieving good connectivity while reducing interferences and noise within hotspots during connection and use.

Figure 1:
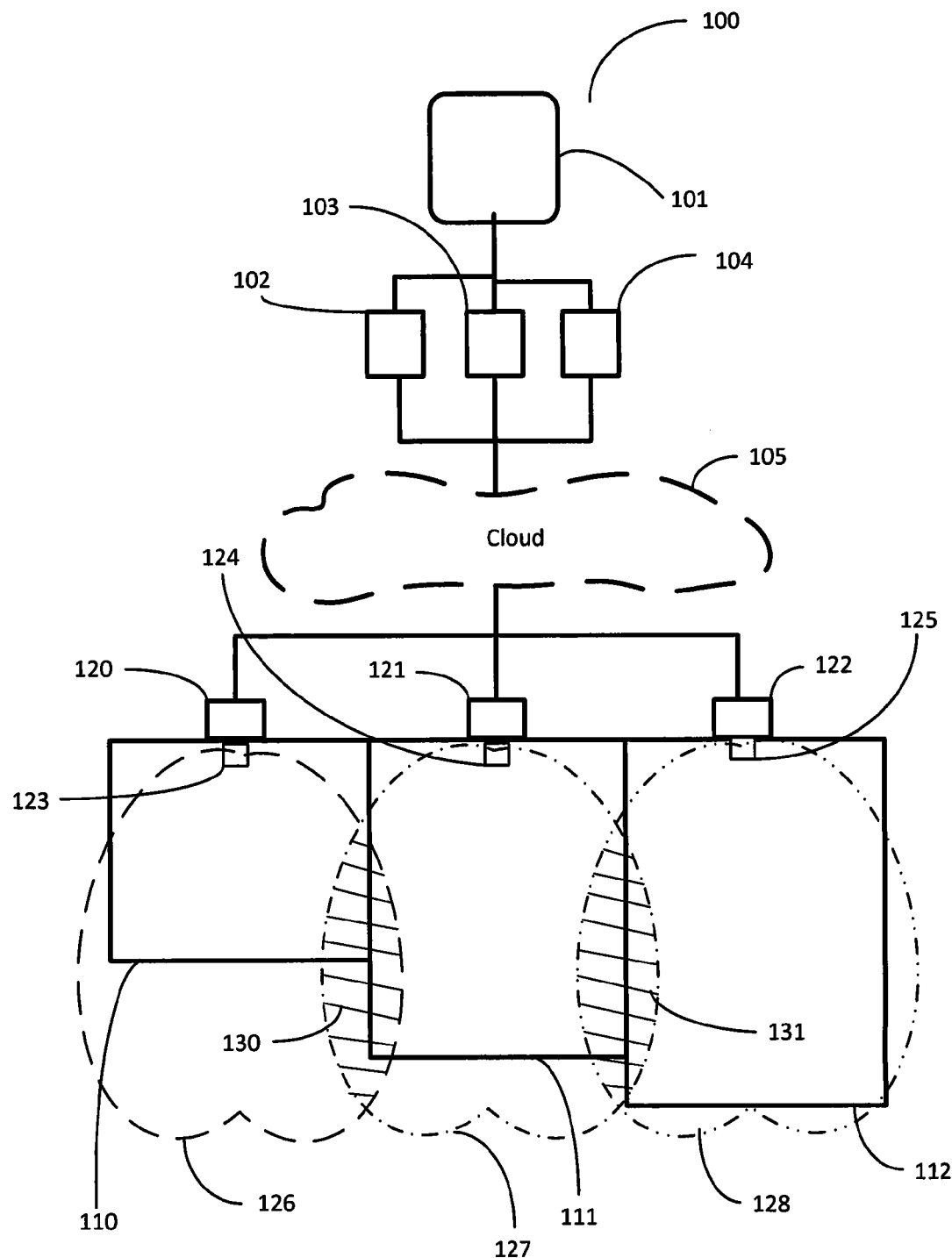
FIG. 1 is a block diagram showing the prior art use of different frequencies for adjacent wireless hot spots that enable interference and fading free connections.
Figures 2, 3:
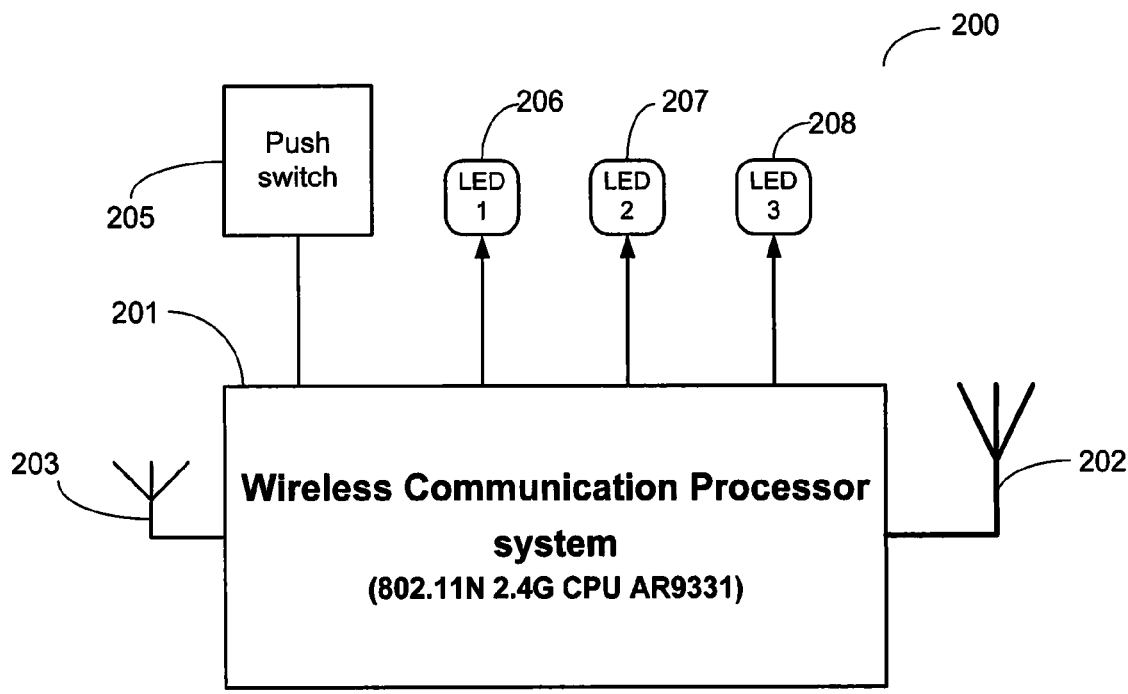
FIG. 2 is a block diagram of a WHS enabled to adjust the power level, to three different values, using a switch with LEDs for power level indication, according to an embodiment of the present invention.
FIG. 3 is a table showing the power levels and LED setting of the WHS of FIG. 2, according to an embodiment of the present invention.

FIG. 2 is a block diagram 200 of a WHS according to an embodiment of the present invention, enabled to adjust the power level, to three different values, using a toggle switch 205 with LEDs 206, 207, and 208 for power level indication. The WHS 200, comprises the wireless communication processor system 201, which may have a communication CPU associated with a wireless transmitter-receiver unit for communicating over a network such as 802.11N. The communication processor system also has receiving and transmitting antennas 202 and 203, to enable connection to the wireless devices in the vicinity. The communication processor system 201 is connected to the power level toggle switch 205 that allows the transmitted power levels to be adjusted and connected to power level indicator LEDs 206, 207, 208 that may indicate the transmitted power level. The WHS may be connected to a PLC LAN or other type of LAN that is connected to the internet via a gateway to provide the necessary connectivity and communication capability to the outside world for the devices connected via the WHS. The WHS 200 can be connected to the PLC network through a data communication enabled power switch unit (ETH), described in related U.S. application Ser. No. 13/153,194 described above.

FIG. 3 shows a table of settings for toggle switch 205 and the transmitter power delivered by the WHS 200. As an example, When the RF power is off, the transmission power setting is in a "RF power off" state 301 which is indicated by all LEDs 206, 207, and 208 being in the off state, that is, with no LEDs 206, 207, or 208 powered or lighted. Pressing and holding the toggle switch for a 3 second interval while in state 301 causes the sensor to transition to "RF power low" 302 state indicated by LED1 206 in an on state (powered and lighted) while the other two LEDs 207 and 208 are in the off state. Pressing and holding the toggle switch for a 3 second interval while in state 302 causes the sensor to transition to "RF power medium" 303 state indicated by LED1 206 and LED2 207 in an on state while LED 208 is in the off state. Pressing and holding the toggle switch for a 3 second interval while in state 303 causes the sensor to transition to "RF power high" 304 state indicated by all LED's (LED1 206, LED2 207, and LED3 208) in an on state. Pressing and holding the toggle switch for a 3 second interval while in state 304 returns the sensor to the "RF power off" 301 state.

The type of switch used and the indication pattern are only provided as an example and may modified. Electronic switching based on recognized fading and interference patterns are also possible as an alternate implementation to the switch described, as technology improves and costs come down for automated sensing and control. Also the number of power levels and states of the WHS 200 may be changed to add more power states without prejudice.

Figure 4:
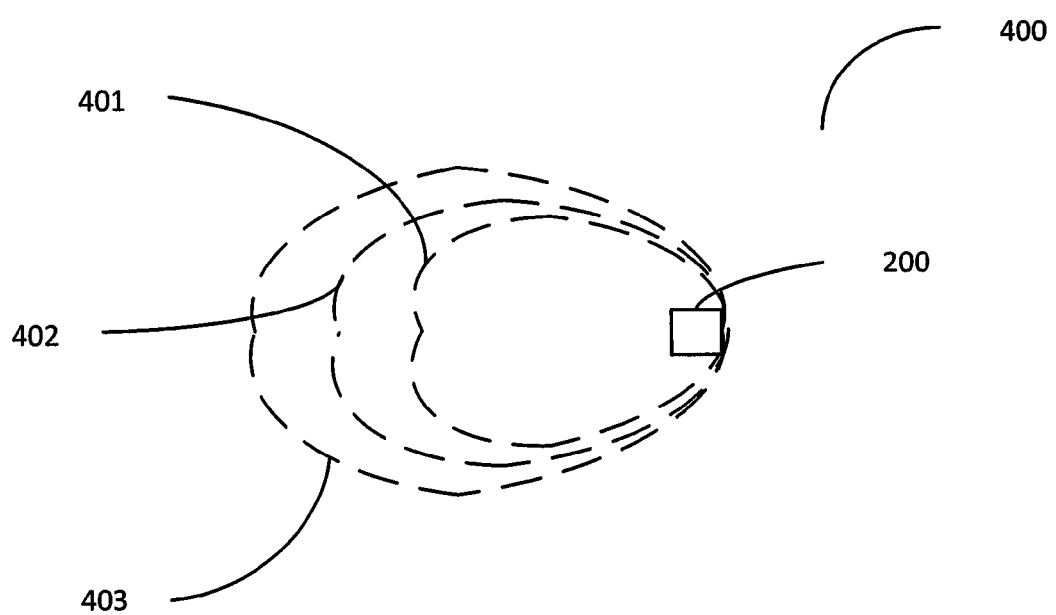
FIG. 4 is a diagram showing coverage provided by the WHS of FIG. 2 for the different switch positions, according to an embodiment of the present invention.

FIG. 4 is a diagrammatic representation 400, which shows the set of exemplary transmission power lobes for the four power level setting selectable using the toggle switch 205 of the WHS 200. As is clear when the switch is set to RF power off 301 the sensor 200 puts out no transmitted power and no data is transmitted. When the toggle switch 205 is depressed and held for 3 seconds, the LED1 lights up indicating the low setting for transmitted power as indicated by the power lobes 401 of the transmitted power from the WHS 200. Further depressing the toggle switch for another 3 seconds changes the power transmission indication to have LED1 and LED2 lighted showing RF power transmission of medium power with the coverage provided by the power transmitted shown by the power lobes 402. A third toggle of the switch by 3 seconds lights up the three LEDs, 206, 207 and 208, and maximum available RF power is output by the WHS 200 with coverage provided by the power lobes 403.

Figure 5:
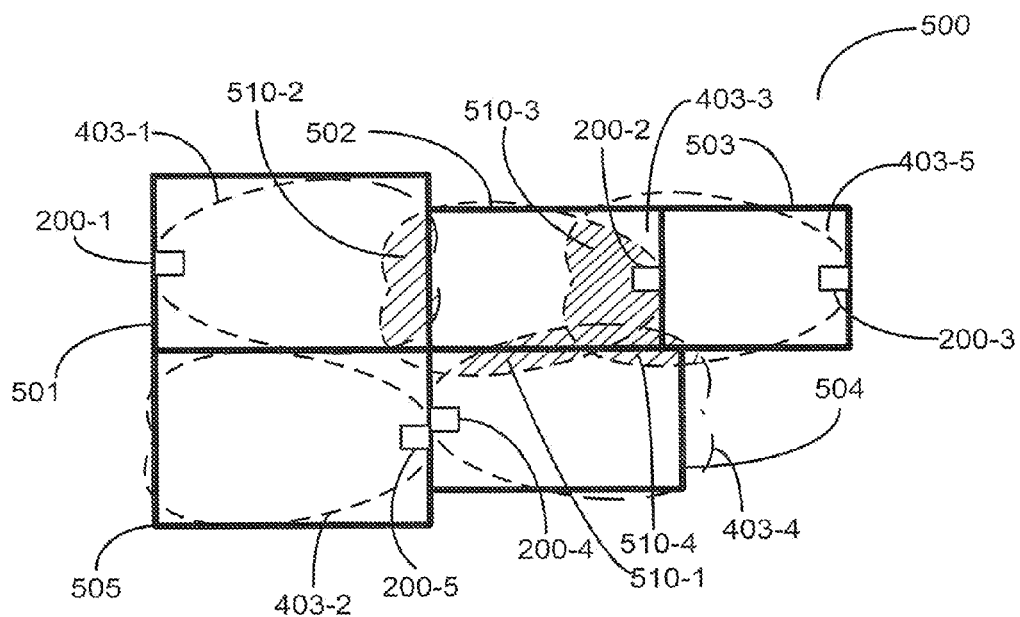
FIG. 5 is a block diagram showing the interference caused by overlap of power lobes when using multiple WHSs, adjacent to one another, having the same frequency spectrum, in a wireless LAN, according to an embodiment of the present invention.

FIG. 5 is an exemplary block diagram representation 500 showing the use of a single power level setting for multiple adjacent WHSs, 200-1 to 200-5 covering rooms or areas 501 to 505. Using the highest power level setting 304 providing power lobes 403-1 to 403-5, for the all the WHSs 200-1 to 200-5 used, the wireless LAN area is completely covered but the coverage creates power lobe overlaps 510-1 to 510-4 where the interference and fading occur. The phrase "wireless LAN area" as used herein refers to a set of points in three-dimensional space in which one or more wireless signals is intended to be received by wireless receivers with sufficient signal strength for use in performing data transactions.

Figure 6:
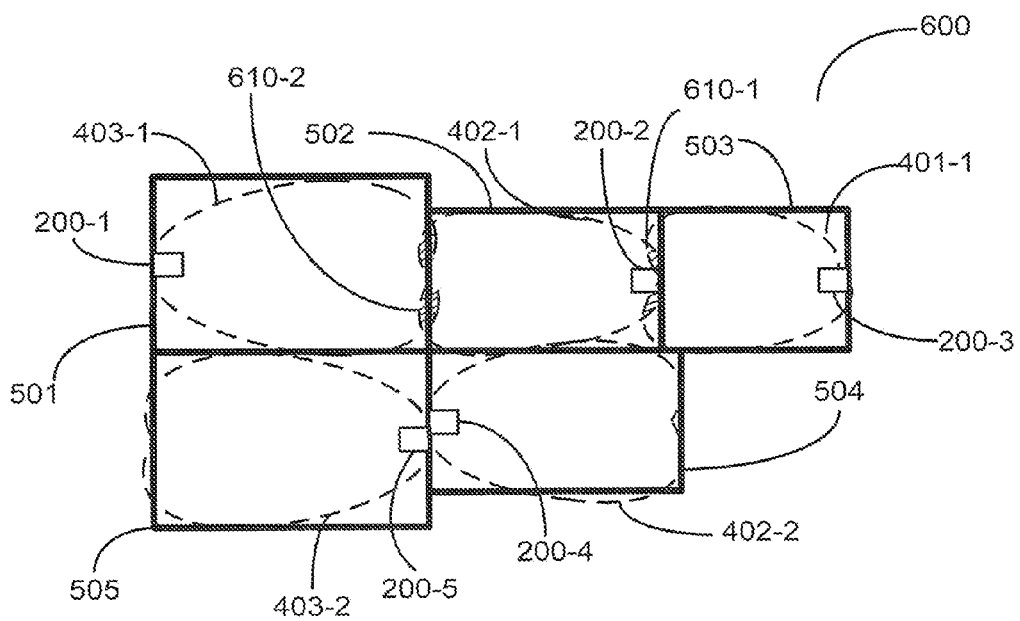
FIG. 6 is a block diagram showing the use of the adjustable power, wireless hot spot sensor, to enable coverage of adjacent areas with reduced interference and fading when using the same frequency spectrum, according to an embodiment of the present invention.

FIG. 6 is an exemplary block diagram representation 600 of the same wireless LAN area as in FIG. 5 with the WHSs 200-1 to 200-5 which have the power settings adjusted to reduce the power lobe overlaps while still providing coverage within the wireless LAN. The method for setting the power levels 403 to 401 of each of the WHSs 200 used to cover the wireless LAN area while providing good coverage with reduced fading and interference is shown in flow chart of FIG. 7. Using the capability to adjust the power of the WHS, the fading and interference caused by overlapping power lobes of adjacent WHSs can be reduced. FIG. 6 shows the use of WHSs 200-1 to 200-5 to provide optimum coverage of the wireless LAN area with power settings adjusted to reduce the fading and interference caused by overlapping power lobes when the adjacent WHSs have the same transmission frequency spectrum. As shown the exemplary area of the wireless LAN, comprising the room blocks 501 to 505. The WHSs 200-1 and 200-5 in the large room areas 501 and 505 are set to the switch condition 304 to deliver the maximum RF power coverage illustrated by power lobes 403-1 and 403-2 respectively. The WHSs in rooms 502 and 504, 200-2 and 200-4 are set to the switch condition 303 for delivering medium RF power providing coverage illustrated by power lobes 402-1 and 402-2 respectively. Similarly the RF power setting of the WHS 200-3 in room 500-3 is set as in switch setting 302 to deliver the low level of RF power 401-1. As seen, the transmission power lobes overlap is reduced by the selection of the appropriate power level 401 to 403, thereby reducing the fading and interference when using wireless enabled devices within the wireless LAN.

Figure 7:
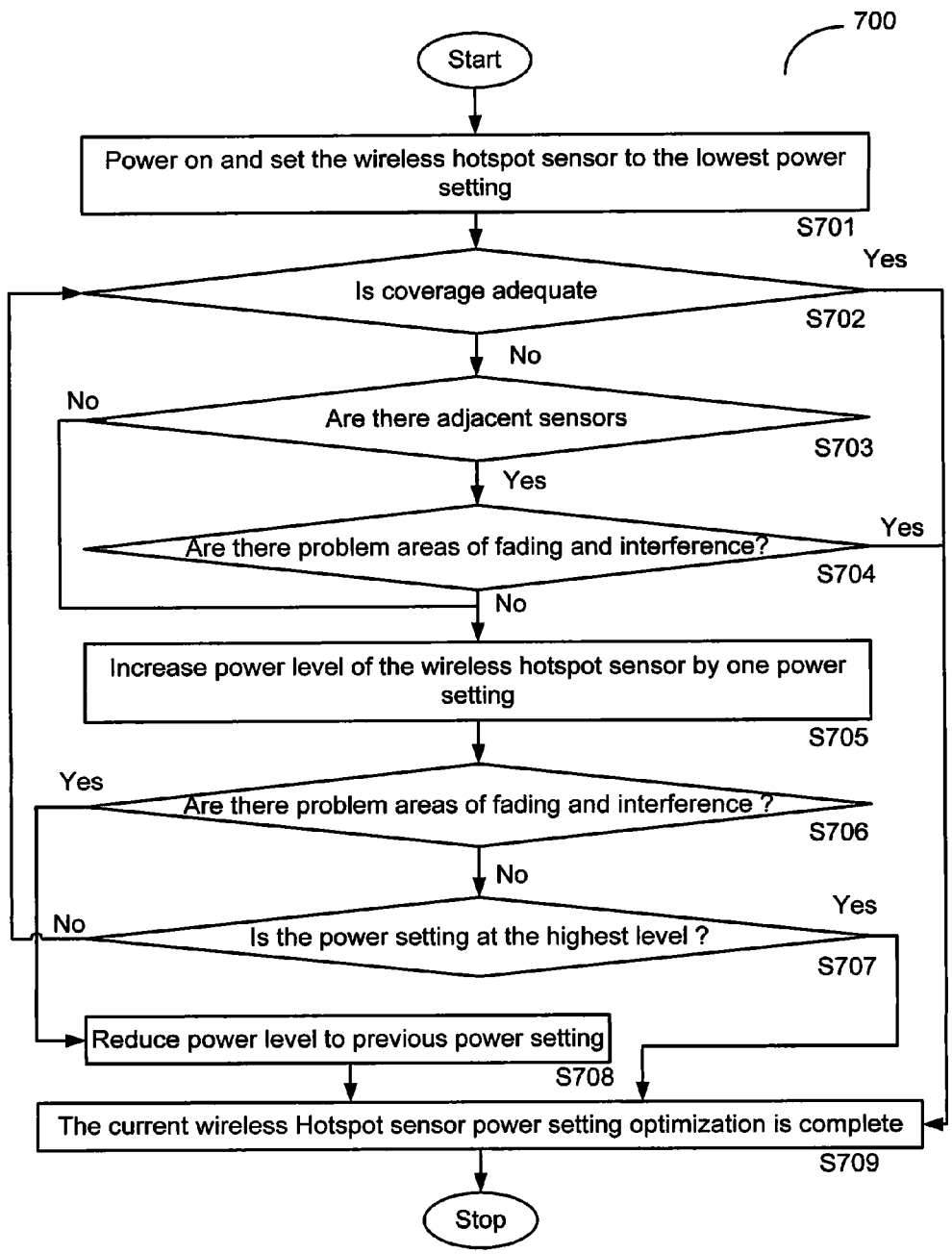
FIG. 7 is a flow chart showing of using the switches to adjust the power output of each of the WHSs to optimize the coverage, according to an embodiment of the present invention.

FIG. 7 is an exemplary and non-limiting flow chart 700 showing how the power level setting of a WHS can be done to have minimum fading and interference when used adjacent to another WHS transmitting on the same frequency spectrum. The WHS is connected and powered on and set to the lowest power level providing the lowest RF coverage with the transmitted power lobes (S701). The physical coverage provided is checked to see if it is adequate (S702). To determine physical coverage, a wireless transmitter-receiver unit is placed at various use locations within the expected coverage area. If the signal strength received at a particular use location is strong enough to support normal data transactions, then the particular use location may be considered to be adequately covered. In an embodiment, one or more sample data transactions, either randomly selected or pre-determined, may be attempted, and if the data transactions complete successfully, the particular use location may be determined to be adequately covered. For example, an email message may be sent and received or a video streamed to the receiver over the wireless signal between the transmitter and the WHS. If all tested locations within the coverage area have adequate coverage, then the WHS is considered to provide adequate coverage for the wireless LAN area.

If the overall physical coverage provided is adequate, the WHS is considered optimized for use, and the power setting exercise is stopped. (S709). If the coverage is not adequate, that is, one or more required use locations within the expected wireless coverage areas are not covered by the WHS, then the area is checked to see if there are WHS that are adjacent to the current WHS providing coverage (S703). If Adjacent WHSs are present, the required coverage area is checked to see if there are areas of fading and interference within the current coverage area. This may be done by using the wireless transmitter-receiver unit at typical use locations and identifying loss of reception due to fading and interference (S704).

In an embodiment, loss of reception due to fading at typical use locations may be determined by measuring signal strength of useful signal at each use location and comparing the signal strength against a threshold signal strength. Fading may be detected when the measured signal strength of usable data intermittently falls below the threshold signal strength. Interference is when the noise level due to multiple transmissions of the received signals becomes large and obscures the usable signal received at a location. Fading and/or interference make the received signal unusable or difficult to understand. In another embodiment, fading and/or interference may be detected by failing to perform a data transaction that succeeds when only the nearest hotspot is transmitting. If fading and interference exist, the power level of the current WHS cannot be increased without adversely impacting the operation of the adjacent WHS unit and hence the current WHS unit is operating at its optimum power level. Further optimization is hence stopped (S709).

In an embodiment, fading and interference are determined to exist when fading or interference is detected at any of the tested locations. In an alternate embodiment, an algorithm, expert system, or human judgment may be used to determine if fading and interference exist for the covered area as a whole based on the determinations for each tested location.

If no adjacent WHS are found or if adjacent WHS exist but there are no problem areas of fading and interference then the power setting of the WHS is increased by one setting, providing the next level of RF coverage of the area using the power lobes (S705.) The coverage area is again checked to see if there are problem areas of fading and interference (S706). If such areas exist with the increased power level then the power level is reduced by one level and further optimization of the power setting of the WHS is stopped (S708).

If no problem areas of fading and interference are found during the check at S706, the power level setting is checked to see if the power setting is at the highest level or not (S707). If the power setting of the WHS is found to be at the maximum level then the WHS is providing the best coverage it can with minimum fading and interference and so the optimization of the power setting is complete and the optimization is stopped (S709).

If the power setting is not at the maximum level then the optimization operation is repeated from step S702 until the coverage is found to be adequate, the fading and interference impact adjacent WHS coverage, or the WHS power setting reaches maximum power level under which conditions the optimization is complete, and the operation of optimizing the power setting of the WHS is stopped (S709).

In a wireless LAN with multiple WHSs providing the necessary area coverage, it is necessary to check and optimize each of the WHSs as indicated above. This is necessary to achieve a low level of fading and interference while providing adequate coverage of areas within the wireless LAN.

A person skilled-in-the-art would readily appreciate that the invention disclosed herein is described with respect to specific exemplary embodiments of the devices and systems currently used. However, these described embodiments should not be considered limitations on the scope of the invention. Specifically, other implementations of the disclosed invention are envisioned and hence the invention should not be considered to be limited, to the specific embodiments discussed herein above. These units, devices, and systems may be implemented as hardware and/or software implemented and running over hardware as assembly of individual components, as a combination of components and integrated circuits, or SOCs. The invention should not be considered as being limited in scope based on specific block level details, but should be considered on the basis of current and future envisioned functionality.

Although the invention is described herein with reference to the preferred embodiment, one skilled in the art will readily appreciate that other implementations and applications may be substituted for those set forth herein without departing from the spirit and scope of the present invention. Accordingly, the invention should only be limited by the Claims included below.

The invention claimed is:

1. A wireless hotspot sensor system comprising:
a plurality of wireless hotspot sensors distributed over an area corresponding to a local area network (LAN);
wherein each of the wireless hotspot sensors is enabled to transmit a radio frequency output signal in at least an axial direction outward from the corresponding wireless hotspot sensor, wherein the corresponding radio frequency output signal has a directional power lobe defined in the axial direction, wherein the directional power lobe has an adjustable radio frequency output power level;
wherein each of the wireless hotspot sensors includes a switch for adjusting the radio frequency output power level of the corresponding directional power lobe, and a power level indicator for monitoring the radio frequency output power level of the corresponding directional power lobe;
wherein each of the wireless hotspot sensors are interconnected using a power line communication (PLC) network within the LAN;
wherein the wireless hotspot sensors are spatially separated from each other, and are enabled to simultaneously transmit a common output signal over a common radio frequency spectrum to provide wireless coverage in the LAN;
wherein each of the wireless hotspot sensors is enabled to adjust the corresponding radio frequency output power level responsive to activation of the corresponding switch;
wherein each of the wireless hotspot sensors is further configured to indicate the current corresponding radio frequency output power level through the corresponding power level indicator; and
wherein the radio frequency output power level of each of the wireless hotspot sensors is enabled to provide effective wireless area coverage within the LAN while eliminating or reducing wireless interference and fading due to a first directional power lobe of a first wireless hotspot sensor of the wireless hotspot sensors interfering with a second directional power lobe of a second wireless hotspot sensor of the wireless hotspot sensors, transmitting on the same radio frequency on the LAN.

2. The wireless hotspot sensor system of claim 1, wherein:
the first wireless hotspot sensor is adjusted to transmit at a first radio frequency power level;
the second wireless hotspot sensor is adjusted to transmit at a second radio frequency output power level; and
the first radio frequency power level is different from the second radio frequency output power level.

3. The wireless hotspot sensor system of claim 2,
wherein the first directional power lobe and the second directional power lobe overlap when operated at a maximum power level; and
wherein the first radio frequency output power level and the second radio frequency output power level are adjusted to values that reduce an overlap of the first directional power lobe and the second directional power lobe.

4. The wireless hotspot sensor system of claim 3, wherein the first and second wireless hotspot sensors are located in adjacent rooms.

5. The wireless hotspot sensor system of claim 1, wherein the plurality of wireless hotspot sensors are adjusted to improve area coverage within the LAN.

6. The wireless hotspot sensor system of claim 1, wherein the wireless hotspot sensors are configured to provide any of communication or streaming of media through the PLC.

7. The wireless hotspot sensor system of claim 1, wherein the switch on each wireless hotspot sensor is a toggle switch, which when pressed, advances the power level by one power level setting.

8. The wireless hotspot sensor system of claim 1, wherein the power level indicator on each wireless hotspot sensor comprises a plurality of LED's, each LED of the plurality of LED's having an "on" or "off" state; and
wherein the radio frequency power level is indicated based on the combination of states of the plurality of LED's.

9. A method comprising:
distributing a plurality of wireless hotspot sensors over an area corresponding to a wireless local area network (LAN), wherein each of the wireless hotspot sensors is enabled to transmit a radio frequency output signal, in at least an axial direction outward from the corresponding wireless hotspot sensor, wherein the corresponding radio frequency output signal has a directional power lobe defined in the axial direction, wherein the directional power lobe has an adjustable radio frequency output power level, wherein each of the wireless hotspot sensors includes a switch for adjusting a radio frequency output power level of the corresponding directional power lobe, and a power level indicator for monitoring the radio frequency output power level of the corresponding directional power lobe, wherein the wireless hotspot sensors are spatially separated from each other;
interconnecting each of the wireless hotspot sensors using a power line communication (PLC) network within the LAN;
simultaneously transmitting a common radio frequency output signal from each of the wireless hotspot sensors over a common radio frequency spectrum to provide wireless coverage within the LAN; and
for each of the wireless hotspot sensors, activating the corresponding switch to adjust the radio frequency output power level of the transmitted radio frequency output signal, wherein the current transmitted radio frequency output power level is indicated by the corresponding power level indicator, to provide effective wireless area coverage within the LAN while eliminating or reducing wireless interference and fading due to a first directional power lobe of a first wireless hotspot sensor of the wireless hotspot sensors interfering with a second directional power lobe of a second wireless hotspot sensor of the wireless hotspot sensors, transmitting on the same radio frequency on the LAN.

10. The method of claim 9, wherein adjusting the radio frequency output power level of the corresponding directional power lobe of each corresponding wireless hotspot sensor comprises:
   if the corresponding wireless hotspot sensor is in an "off" state, setting the radio frequency output power level of the corresponding directional power lobe to a lowest power setting;
   determining whether or not coverage is adequate;
   determining whether or not there are problem areas of fading or interference; and
   responsive to determining that coverage is adequate, leaving the radio frequency output power level at the current level.

11. The method of claim 10, wherein determining whether or not coverage is adequate comprises:
   selecting a plurality of locations within the wireless LAN area where coverage is required; and
   for each location of the plurality of locations determining whether a received output signal generated by the corresponding wireless hotspot sensor is sufficient to enable data transactions to succeed;
   wherein determining whether the received output signal is sufficient to enable data transactions to succeed comprises using a wireless transmitter-receiver to perform any of:
      attempting to perform a data transaction, and responsive to the data transaction succeeding, determining that the coverage at said each location is adequate; or
      measuring signal strength of the received signal, comparing the output signal strength against a signal strength threshold, and responsive to determining that the signal strength is above the signal strength threshold, determining that the coverage at said each location is adequate.

12. The method of claim 10, wherein adjusting the radio frequency output power level of the corresponding directional power lobe of each corresponding wireless hotspot sensor further comprises:
   responsive to determining that coverage is not adequate and that there are no problem areas of fading or interference, increasing the output power level for each wireless hotspot sensor.

13. The method of claim 12, wherein adjusting the radio frequency output power level of the corresponding directional power lobe of each corresponding wireless hotspot sensor further comprises:
   determining whether or not increasing the output power level has resulted in areas of interference or fading; and
   responsive to determining that increasing the transmitted radio frequency power level has resulted in areas of interference or fading, decreasing the transmitted radio frequency output power level to a previous level.

14. The method of claim 12, wherein adjusting the transmitted radio frequency output power level of the corresponding directional power lobe of each wireless hotspot sensor further comprises:
   determining whether or not the increasing the transmitted radio frequency output power level has resulted in areas of interference or fading;
   responsive to determining that increasing the transmitted radio frequency output power level has not resulted in areas of interference or fading:
   further determining whether or not the transmitted radio frequency output power level has reached the highest power level;

responsive to determining that the transmitted radio frequency output power level has reached the highest power level, leaving the transmitted radio frequency output power level at the highest power level; and
   responsive to determining that the transmitted radio frequency output power level has not reached the highest power level, repeating the method of claim 10 with the current power level.

15. The method of claim 9, wherein the wireless hotspot sensors provide connectivity for any of communication or streaming of media through the PLC.

16. A method comprising:
   distributing a plurality of wireless hotspot sensors over an area corresponding to a wireless local area network (LAN), wherein each of the wireless hotspot sensors is enabled to transmit a radio frequency output signal in at least an axial direction outward from the corresponding wireless hotspot sensor, wherein the corresponding radio frequency output signal has a directional power lobe defined in the axial direction, wherein the directional power lobe has an adjustable radio frequency output power level, wherein each of the wireless hotspot sensors includes a switch for adjusting a radio frequency output power level for the corresponding directional power lobe, and a power level indicator for monitoring the radio frequency output power level of the corresponding directional power lobe, wherein each of the wireless hotspot sensors are spatially separated from each other;
   interconnecting each of the wireless hotspot sensors using a power line communication (PLC) network within the wireless LAN;
   simultaneously transmitting a common radio frequency output signal from each of the wireless hotspot sensors over a common radio frequency spectrum to provide wireless coverage within the wireless LAN;
   obtaining a first set of data including locations within the wireless LAN of fading and interference of a first directional power lobe generated by a particular wireless hotspot sensor in the presence of adjacent wireless hotspot sensors that are simultaneously transmitting on the common radio frequency;
   based on the first set of data, using the switch on the particular wireless hotspot sensor to adjust the radio frequency output power level of the corresponding transmitted output signal;
   obtaining a subsequent set of data including locations within the wireless LAN of fading and interference of a second directional power lobe generated by the particular wireless hotspot sensor after the adjustment is made;
   based on the second set of data, using the switch on the particular wireless hotspot sensor to adjust the radio frequency output power level of the corresponding transmitted output signal; and
   repeating the method for each of the other wireless hotspot sensors to provide effective wireless area coverage within the wireless LAN while eliminating or reducing wireless interference and fading due to the first directional power lobe interfering with the second directional power lobe, on the common radio frequency on the wireless LAN.

17. The method of claim 16 wherein the wireless hotspot sensors receive power and data through the PLC.

18. The method of claim 16 wherein the locations within the wireless LAN area of fading and interference is determined by:

selecting a plurality of locations within the wireless LAN area where coverage is required;

for each location of the plurality of locations determining whether a radio frequency output signal generated by the corresponding wireless hotspot sensor is sufficient to enable data transactions to succeed;

wherein determining whether a radio frequency output signal is sufficient to enable data transactions to succeed comprises using a wireless transmitter-receiver to perform at least one of:

attempting to perform a pre-determined data transaction, and responsive to the data transaction failing, determining that said each location is a location of fading and interference; or measuring a signal strength of a received output signal, comparing the output signal strength against a pre-determined threshold, and responsive to determining that the signal strength is below the pre-determined threshold, determining that said each location is a location of fading and interference.

* * * * *